US008928491B2

(12) United States Patent
Ramanathan et al.

(10) Patent No.: US 8,928,491 B2
(45) Date of Patent: Jan. 6, 2015

(54) DATA COLLECTION USING A HEADSET JACK OF AN ELECTRONIC DEVICE

(75) Inventors: Nithya Ramanathan, Los Angeles, CA (US); Martin Ladislav Lukac, Los Angeles, CA (US)

(73) Assignee: Nexleaf Analytics, Los Angeles, CA (US)

( * ) Notice: Subject to any disclaimer, the term of this patent is extended or adjusted under 35 U.S.C. 154(b) by 1008 days.

(21) Appl. No.: 13/021,619

(22) Filed: Feb. 4, 2011

(65) Prior Publication Data

US 2012/0038488 A1 Feb. 16, 2012

Related U.S. Application Data

(60) Provisional application No. 61/374,165, filed on Aug. 16, 2010.

(51) Int. Cl.
*G08C 19/22* (2006.01)
*H04Q 9/00* (2006.01)

(52) U.S. Cl.
CPC ............. *H04Q 9/00* (2013.01); *H04Q 2209/75* (2013.01)
USPC .................................................. 340/870.07

(58) Field of Classification Search
CPC ........... A63B 2225/50; A63B 2230/04; A63B 2230/202; A63B 2230/207; A63B 2230/30; A63B 2230/50; A63B 69/0028; A63B 71/0686; A63B 2024/0009; A63B 2024/0025; A63B 2024/0068; A63B 2071/0625
USPC ............... 340/573.1, 539.26, 870.11; 381/74; 455/67.11

See application file for complete search history.

(56) References Cited

U.S. PATENT DOCUMENTS

| | | | |
|---|---|---|---|
| 2008/0079571 A1* | 4/2008 | Samadani | 340/552 |
| 2009/0287067 A1* | 11/2009 | Dorogusker et al. | 600/300 |
| 2010/0208631 A1* | 8/2010 | Zhang et al. | 370/297 |
| 2010/0217100 A1* | 8/2010 | LeBoeuf et al. | 600/301 |

* cited by examiner

*Primary Examiner* — Brian Zimmerman
*Assistant Examiner* — Thomas McCormack
(74) *Attorney, Agent, or Firm* — Morrison & Foerster LLP

(57) ABSTRACT

To collect data, an electronic device transmits a signal on an output channel of the headset jack to provide an excitation signal to a sensor for measuring a physical quantity. A signal from the sensor is received via an input channel of the headset jack of the electronic device. Data based on the received signal may be sent from the electronic device to a remote location for further processing. The data may be used to detect a physical condition, e.g., a temperature, humidity, soil moisture, sound, vibration, pressure, motion, and/or pollutants.

21 Claims, 4 Drawing Sheets

DATA COLLECTION USING A HEADSET JACK OF AN ELECTRONIC DEVICE

CROSS REFERENCE TO RELATED APPLICATION

The present application claims benefit to previously filed provisional patent application Ser. No. 61/374,165, entitled "DATA COLLECTION USING A HEADSET JACK OF AN ELECTRONIC DEVICE," filed on Aug. 16, 2010, and for which the entire content is incorporated herein by reference for all purposes.

BACKGROUND

1. Field

This application relates generally to data collection and data analysis, and more specifically to systems and processes for collecting and analyzing data detected by sensors connected to a headset jack of a wireless device.

2. Related Art

Recently, scientific evidence has shown that cooking, lighting, and heating with biofuels, e.g., firewood, dung, and crop residues, in Asia contribute up to two-thirds of black carbon (BC) and other pollutants, which are making a huge impact on climate change. Switching to cleaner-burning technologies, such as solar cookers and lamps, biogas plants, and other efficient stoves, will reduce these pollutants and their negative climate effects.

One way to incentivize households to switch over to cleaner-burning technologies is to enable these households to sell carbon credits (i.e., monetary credits in exchange for a reduction of greenhouse gas emission) by using cleaner-burning technologies. For example, based on a carbon price of $5-10 per ton of carbon, a household in India participating in such a program may receive 15-25 cents per day for carbon credits, which amount to 10-20% of the household's daily salary.

To calculate the amount of carbon credits, the household's amount of time spent cooking using the cleaner-burning technologies needs to be determined. However, traditional data collection techniques do not lend themselves to large scale deployment because they are inefficient and costly. For example, retrospective self-reports from participating households are labor-intensive and unreliable. In-situ data logging instruments are often expensive and invasive, and they often require domain expertise.

Thus, there is a need for an improved method of collecting data from many households or individuals at a low cost.

SUMMARY

To collect data, an electronic device transmits a signal on an output channel of a headset jack to provide an excitation signal to a sensor for measuring a physical quantity. A signal from the sensor is received via an input channel of the headset jack of the electronic device. Data based on the received signal may be sent from the electronic device to a remote location for further processing. The data may be used to detect a physical condition, e.g., temperature, humidity, soil moisture, sound, vibration, pressure, motion, pollutants, and so on.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Disclosed in the present application are systems and processes for collecting data remotely from a location, household, or an individual via a headset jack of an electronic device. Broadly, and in one example, the electronic device transmits a signal on an output channel of the headset jack to provide an excitation signal to a sensor. The sensor measures a physical quantity and a signal from the sensor is received via an input channel of the headset jack of the electronic device. Data based on the received signal may be sent from the electronic device to a remote location for further processing. The data may be used to detect a physical condition.

Exemplary systems and processes described are particularly applicable to collecting temperature data for determining the time a household spends using cleaner-burning technologies, including solar cookers and lamps, biogas plants, and other efficient stoves, which may be used to determine carbon credits or the like. Thus, exemplary systems and processes are described below in this context. It should be recognized, however, that these exemplary systems and processes can be used to collect other types of data for monitoring physical or environmental conditions, such as humidity, soil moisture, sound, vibration, pressure, motion, and pollutants, using various kinds of sensors. These exemplary systems and process may also be used in industrial process monitoring and control, machine health monitoring, and the like.

Figure 1:
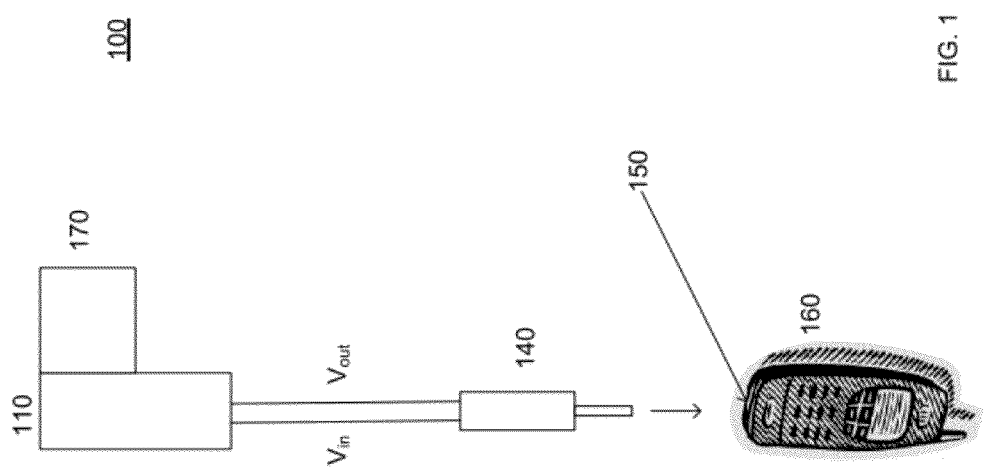
FIG. 1 depicts an exemplary embodiment 100 for collecting data in accordance with the present application.

FIG. 1 depicts an exemplary embodiment 100 for collecting data in accordance with the present application. The exemplary embodiment 100 comprises a sensor, in this particular example, a temperature sensor 110, and a connector 140 for a headset jack 150 of an electronic device 160. In some applications, the exemplary embodiment 100 is connected to a cleaner-burning stove or cooker 170. For example, the temperature sensor 110 may be attached to an external component of a cleaner-burning cooker 170 such that the sensor 110 is in physical contact with the cooker 170. In some exemplary embodiments, a hook or connector for attaching the temperature sensor 110 to the cooker 170 can withstand temperatures over 500° C.

Figure 2:
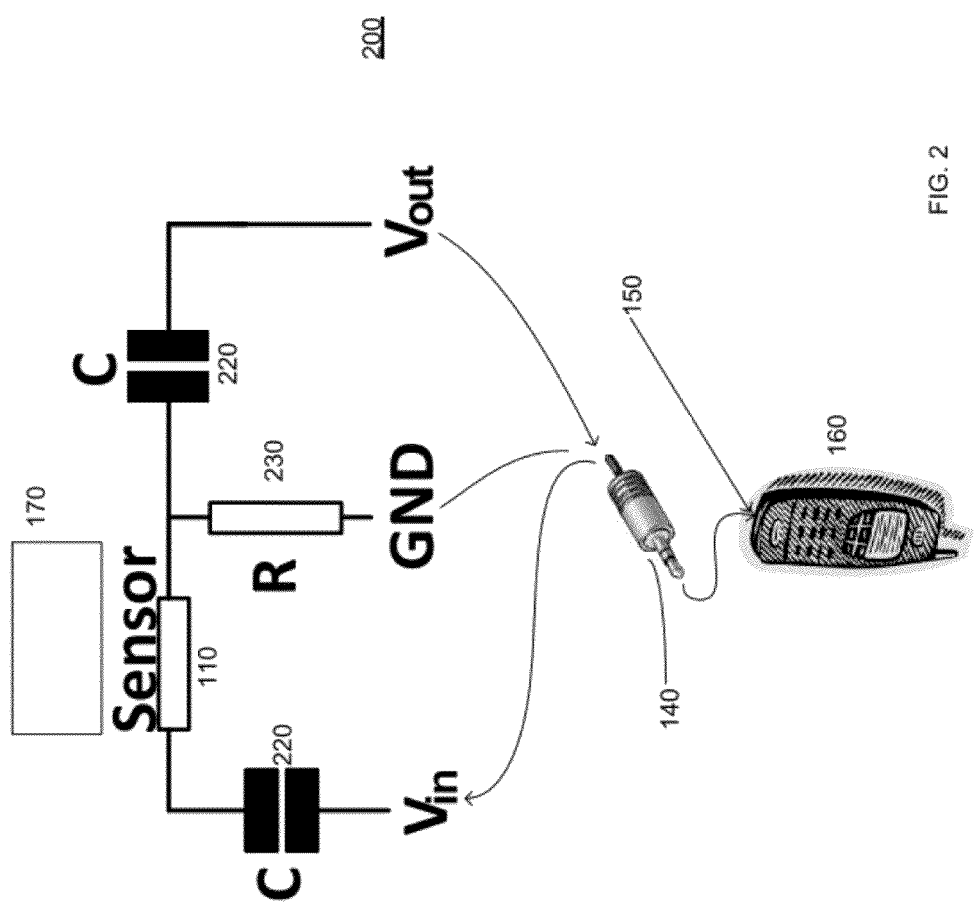
FIG. 2 depicts another exemplary embodiment 200 for collecting data in accordance with the present application.

FIG. 2 depicts another exemplary embodiment 200 for collecting data in accordance with the present application. The exemplary embodiment 200 comprises a temperature sensor 110, one or more capacitors 220, one or more resistors 230, and a connector 140 for a headset jack 150 of an electronic device 160. In some applications, the exemplary embodiment 200 is connected to a cleaner-burning stove or cooker 170.

With reference to FIGS. 1 and 2, temperature sensor 110 measures temperature of a stove or a kitchen and converts the temperature into a signal. In the exemplary embodiment 200, temperature sensor 110 is a thermistor, a type of resistor whose resistance varies with temperature. When a signal $V_{in}$ is transmitted to provide an excitation signal to sensor 110, a signal $V_{out}$ from the temperature sensor 110 is a voltage. For example, the thermistor may be a 10 k ohm Vishay thermistor (model no.: NTCLE203E103FBO). However, one of ordinary skill in the art will realize that other types of temperature sensors may be used as well. For example, the temperature sensor 110 may be a thermocouple, resistance temperature detector (RTD), temperature-transducer integrated circuit, and the like.

With reference to FIGS. 1 and 2, the headset jack 150 may be a mono or stereo headset jack of an electronic device 160, including a wireless phone, a personal digital assistant (PDA), or other mobile devices. The specific type of connector 140 used in the exemplary embodiment 100 or 200 depends on the size and type of the headset jack 150 provided on the electronic device 160. In the exemplary embodiment 200, the connector 140 is a 3.5 mm TRRS (tip, ring, ring, sleeve) stereo-plus-microphone connector. However, it should be recognized that connectors of other sizes (e.g., 2.5 mm, 6.3 mm) and types (e.g., mono) may be used as well. In the exemplary embodiment 200, the sleeve of connector 140 is connected to ground. The ring closest to the sleeve is a microphone input. This ring is connected to $V_{out}$, a received voltage signal from the temperature sensor 110. The other ring and the tip are the stereo output channels. Accordingly, one of the channels may transmit a signal $V_{in}$ to provide an excitation signal, e.g., an AC signal, to the temperature sensor 110. In another exemplary embodiment, the connector may be a 2.5 mm TRS (tip, ring, sleeve) mono headset connector where the sleeve may be connected to ground, the tip may provide an excitation signal $V_{in}$, and the ring may receive the $V_{out}$ signal from the sensor. Other connector types and configurations are possible, and one of ordinary skill in the art would be able to configure a variety of different connectors to provide a reference ground, provide an excitation signal $V_{in}$ to the sensor, and receive a $V_{out}$ signal from the sensor.

Some electronic devices may put a DC offset on the input and output channels of the headset jack 150, which may affect the performance of the temperature sensor 110. Accordingly, capacitors 220 and resistors 230 are configured as high pass filters as shown in FIG. 2. The high pass filters remove the DC offset, but allow an AC signal to go through.

One of the advantages of exemplary embodiment 100 or 200 is that many different sensors may be connected to the headset jack 150. The electronic device 160 can provide power to the temperature sensor 110 over the headset jack 150, removing the need for the sensor 110 to have its own independent power supply, which may be expensive.

Figure 3:
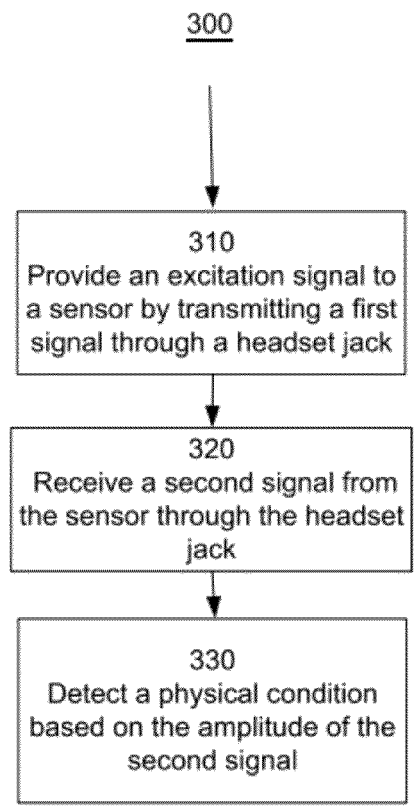
FIG. 3 depicts an exemplary process 300 for collecting data remotely from a location, household, or an individual with the exemplary embodiment 100 or 200 connected to the headset jack of an electronic device.

FIG. 3 depicts an exemplary process 300 for collecting data remotely from a location, household, or an individual with the exemplary embodiment 100 or 200 connected to the headset jack 150 of the electronic device 160.

With continued reference to FIGS. 1 and 2, at 310 of process 300, an excitation signal is provided to the sensor 110 by transmitting a signal $V_{in}$ through the headset jack 150. This signal may be a tone, such as a sine wave. For example, process 300 may transmit a 16 bit signed integer pulse-code modulation (PCM) signal that represents a 200 Hz sine wave. The amplitude may be a percentage of the range of the PCM signal (i.e., ±32768) in order to obtain a dynamic range that is matched to the temperature range that process 300 is expected to measure. An exemplary amplitude is 15 percent of the PCM range.

At 320 of process 300 in FIG. 3, a signal from the sensor $V_{out}$ is received through the input channel of the headset jack 150. With the PCM signal described above as the transmitted signal $V_{in}$ to the sensor 110, $V_{out}$ is a tone at the same frequency as $V_{in}$, but with its amplitude varying with the physical condition, e.g., temperature, measured by the sensor. In other examples, $V_{out}$ may vary from $V_{in}$ by other characteristics, e.g., amplitude, phase, frequency, or combinations thereof, which may depend on the particular sensor and/or electronic device.

At 330 of process 300, the amplitude of the received signal $V_{out}$ may be used to determine whether the physical condition, e.g., temperature, measured by the sensor 110 is above a predetermined value. In some applications, the exemplary embodiment 100 or 200 is connected to a cleaner-burning stove or cooker. Accordingly, a detected temperature above the predetermined value indicates that the cooker or stove is turned on. Process 300 may further determine a household's amount of time spent cooking using the cleaner-burning technologies. It should be recognized that the received signal may be preprocessed and then stored locally on the electronic device 160. When the electronic device 160 has sufficient network connectivity and battery-time, the stored data may be sent as a batch to a remote site (e.g., a back-end server) wirelessly or via the Internet for the processing described above. Alternatively, the received signal may be stored and sent as raw data, if the processing power at the electronic device 160 is limited and the channel capacity available for sending the data is sufficient.

It should be recognized that the transmitting and the receiving of the signals through the headset jack may be implemented by playing and recording audio files. For example, process 300 may play an audio file as if it were playing music over a headphone connected to the headset jack 150. Simultaneously, process 300 may record from the headset jack 150, as if it were recording an audio signal from a microphone. Process 300 may be initiated when the exemplary embodiment 100 or 200 is both connected to a cooker and the electronic device 160. In some exemplary embodiments, process 300 may be awakened by a timer. In some exemplary embodiments, a graphical user interface (GUI) may be provided to allow the user to initiate process 300 by clicking a cursor, pressing a key, and the like. After a short delay, a measurement of the physical condition, e.g., temperature, may be displayed on the screen of the electronic device 160.

Figure 4:
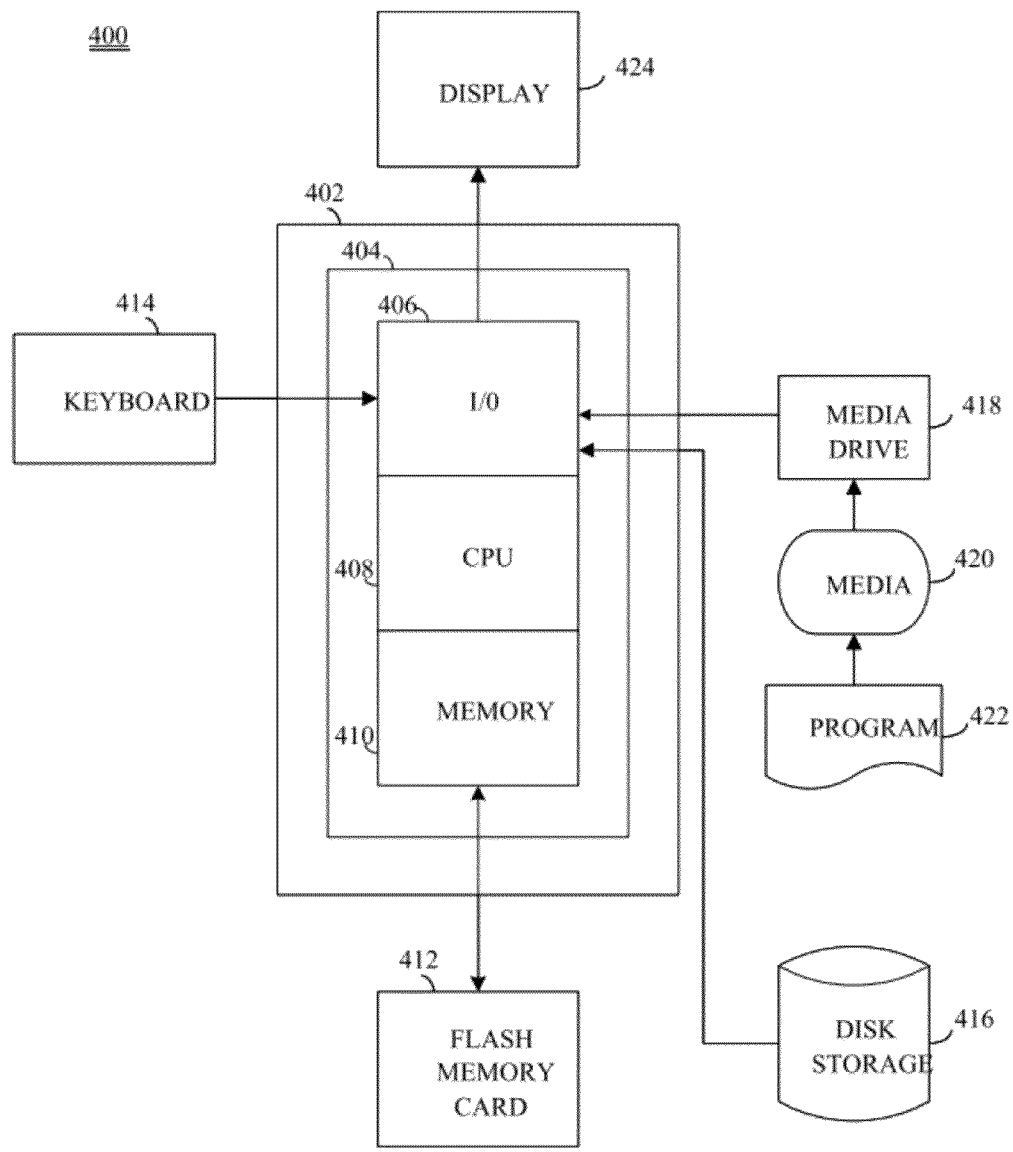
FIG. 4 illustrates an exemplary computing system.

FIG. 4 depicts an exemplary computing system 400 configured to perform any one of the above-described processes. In this context, computing system 400 may include, for example, a processor, memory, storage, and input/output devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform the above-described processes. The main system 402 includes a motherboard 404 having an input/output ("I/O") section 406, one or more central processing units ("CPU") 408, and a memory section 410, which may have a flash memory card 412 related to it. The I/O section 406 is connected to a display 424, a keyboard 414, a disk storage unit 416, and a media drive unit 418. The media drive unit 418 can read/write a computer-readable medium 420, which can contain programs 422 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method of collecting data, the method comprising:
providing an excitation signal to a temperature sensor by transmitting a first signal through a headset jack of a first device, wherein the temperature sensor is coupled to a second device;
receiving a second signal from the temperature sensor through the headset jack;
detecting a temperature associated with the second device based on the second signal; and
determining a time period during which the second device is turned on based on the detected temperature, wherein the temperature sensor is coupled to the second device.

2. The computer-enabled method of claim 1, wherein transmitting the first signal through the headset jack comprises playing a first audio signal through the headset jack.

3. The computer-enabled method of claim 1, wherein receiving the second signal from the sensor through the headset jack comprises recording a second audio signal through the headset jack.

4. The computer-enabled method of claim 1, wherein detecting the temperature comprises detecting the temperature based on the amplitude of the second signal.

5. The computer-enabled method of claim 1, further comprising sending data to a remote location, wherein the data is based on the second signal.

6. The computer-enabled method of claim 1, wherein the second signal comprises a signal having the same frequency as the first signal and having a different amplitude as the first signal.

7. The computer-enabled method of claim 1, further comprising detecting a temperature above or below a predetermined value based on the amplitude of the second signal.

8. The computer-enabled method of claim 1, wherein transmitting the first signal and receiving the second signal comprise transmitting the first signal and receiving the second signal via a connector plugged into the headset jack.

9. The computer-enabled method of claim 8, wherein the connector is selected from the group consisting of a TRS (tip, ring, sleeve) connector and a TRRS (tip, ring, ring, sleeve) connector.

10. The computer-enabled method of claim 1, wherein the first signal is a tone.

11. The computer-enabled method of claim 1, wherein the headset jack is located on a wireless handheld device.

12. A computer system for collecting data, the system comprising:
a temperature sensor, the temperature sensor coupled to the computer system via a headset jack, the temperature sensor operable to detect the temperature of a device;
memory configured to store data; and
one or more processors configured to:
provide an excitation signal to the temperature sensor by transmitting a first signal through the headset jack;
receive a second signal from the temperature sensor through the headset jack;
detect a temperature associated with the device based on the second signal; and
determine a time period during which the device is turned on based on the detected temperature, wherein the device is coupled to the sensor.

13. The computer system of claim 12, the one or more processors further configured to detect the temperature based on the amplitude of the second signal.

14. The computer system of claim 12, the one or more processors further configured to send the data to a remote location.

15. A non-transitory computer-readable storage medium comprising computer-executable instructions for collecting data, the computer-executable instructions comprising instructions for:
providing an excitation signal to a temperature sensor by transmitting a first signal through a headset jack of a first device, wherein the temperature sensor is operable to be coupled to a second device;
receiving a second signal from the temperature sensor through the headset jack;
detecting a temperature of the second device based on the second signal; and
determining a time period during which the second device is turned on based on the detected temperature, wherein the device is coupled to the sensor.

16. The non-transitory computer-readable storage medium of claim 15, the computer-executable instructions for detecting the temperature comprises instructions for detecting the temperature based on the amplitude of the second signal.

17. The non-transitory computer-readable storage medium of claim 15, the computer-executable instructions further comprising instructions for sending data to a remote location, wherein the data is based on the second signal.

18. An apparatus for collecting data, the apparatus comprising:
a temperature sensor;
a connector to a headset jack of a first device; and
wherein an output from the headset jack is coupled to the temperature sensor as an excitation signal for the temperature sensor, and wherein a signal from the temperature sensor is coupled to the headset jack as an input for detecting a temperature of a second device when coupled to the first device, and wherein a time period during which the second device is turned on is determined from the detected temperature when the second device is coupled to the sensor.

19. The apparatus of claim 18, wherein the connector is selected from the group consisting of a TRS (tip, ring, sleeve) connector and a TRRS (tip, ring, ring, sleeve) connector.

20. A computer-enabled method of collecting data, the method comprising:
providing an excitation signal to a temperature sensor by transmitting a first signal through a headset jack;
receiving a second signal from the temperature sensor through the headset jack;
detecting a temperature of a cooker based on the second signal; and
determining a time period during which the cooker is turned on based on the detected temperature, wherein the temperature sensor is coupled to the cooker.

21. The computer-enabled method of claim 1, wherein the device comprises a cooker.

\* \* \* \* \*